United States Patent
Hezar et al.

(10) Patent No.: US 9,806,610 B2
(45) Date of Patent: Oct. 31, 2017

(54) NOISE-SHAPED POWER CONVERTERS

(71) Applicant: Texas Instruments Incorporated, Dallas, TX (US)

(72) Inventors: Rahmi Hezar, Allen, TX (US); Nikolaus Klemmer, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 44 days.

(21) Appl. No.: 14/871,140

(22) Filed: Sep. 30, 2015

(65) Prior Publication Data
US 2017/0093279 A1    Mar. 30, 2017

(51) Int. Cl.
H02M 3/156 (2006.01)
H02M 1/44 (2007.01)

(52) U.S. Cl.
CPC .............. *H02M 3/156* (2013.01); *H02M 1/44* (2013.01)

(58) Field of Classification Search
CPC ......... H03H 17/00; H02M 3/156; H02M 1/12
USPC .................. 323/288; 341/143, 144, 152, 155
See application file for complete search history.

(56) References Cited

U.S. PATENT DOCUMENTS

| | | | | |
|---|---|---|---|---|
| 6,339,360 B1 * | 1/2002 | Santillano | ............. | H03F 3/2171 330/10 |
| 6,342,822 B1 * | 1/2002 | So | ........................... | H03K 7/08 320/145 |
| 6,744,392 B2 * | 6/2004 | Melanson | ........... | H03M 7/3006 341/118 |
| 7,307,557 B2 * | 12/2007 | Wegner | .................... | H03F 3/217 341/50 |
| 7,667,552 B2 * | 2/2010 | Midya | ....................... | H03F 3/217 332/106 |
| 7,940,035 B2 * | 5/2011 | Yang | .................. | H02M 3/33507 323/288 |
| 8,779,957 B2 * | 7/2014 | Rajaee | .................. | H03M 3/452 341/143 |
| 8,901,905 B2 * | 12/2014 | Fayed | .................... | H02M 3/156 323/271 |
| 8,912,776 B2 * | 12/2014 | Qian | ...................... | H02M 3/156 323/282 |
| 8,970,194 B2 * | 3/2015 | Li | ............................ | G05F 1/575 323/282 |
| 2006/0261789 A1 * | 11/2006 | May | .......................... | G05F 1/56 323/274 |
| 2008/0084343 A1 * | 4/2008 | Heyl | ................... | H03H 17/0292 341/144 |
| 2008/0136395 A1 * | 6/2008 | Bennett | .................. | H02M 3/156 323/288 |

(Continued)

FOREIGN PATENT DOCUMENTS

EP    1184961    3/2002

OTHER PUBLICATIONS

Received STIC search report from EIC 2800 searcher John Digeronimo on Sep. 23, 2016.*

(Continued)

*Primary Examiner* — Timothy J Dole
*Assistant Examiner* — Htet Z Kyaw
(74) *Attorney, Agent, or Firm* — Kenneth Liu; Charles A. Brill; Frank D. Cimino (57) ABSTRACT

Noise-shaped frequency hopping power converters are disclosed. An example noise-shaped frequency hopping power converter comprises a shaped number generator having a first output to output a noise-shaped selection signal and a power converter having a first input to receive an input voltage signal, a second input to receive a switching signal that is based on the noise-shaped selection signal, and a second output to output an output voltage signal based on the switching signal.

20 Claims, 4 Drawing Sheets

(56) References Cited

U.S. PATENT DOCUMENTS

| | | | | |
|---|---|---|---|---|
| 2008/0272744 A1* | 11/2008 | Melanson | ........... | H02M 1/4225 |
| | | | | 323/205 |
| 2015/0015221 A1* | 1/2015 | Wrathall | ............. | H02M 3/1588 |
| | | | | 323/271 |
| 2015/0229324 A1* | 8/2015 | Soenen | .................. | H03H 17/00 |
| | | | | 341/143 |
| 2016/0036326 A1* | 2/2016 | Sreenivas | ............. | H02M 3/158 |
| | | | | 323/271 |

OTHER PUBLICATIONS

Ayman Fayed, "Spur-Free Switching Power Converters for Analog and RF Loads", Solid State Circuits Society Visit, Fort Collins Chapter, Mar. 8, 2013, Iowa State University, Power Management Research Lab, 57 pages.

Robert W. Erickson, "DC-DC Power Converters", Department of Electrical and Computer Engineering University of Colorado Boulder, CO 80309-0425, Article in Wiley Encyclopedia of Electrical and Electronics Engineering, 1999, 19 pages.

Hosseini et al., "Mathematical Analysis of Digital MASH Delta-Sigma Modulators for Fractional-N Frequency Syntesizers", copyright 2006, 4 pages.

Mikko Kuisma, "Minimizing Conducted RF-Emissions in Switch Mode Power Supplies Using Spread-Spectrum Techniques", University of Technology, Lappeenranta, Finland, Mar. 12, 2004, ISBN 951-764-875-8, 196 pages.

Rice et al., "Understanding Noise-Spreading Techniques and their Effects in Switch-Mode Power Applications", 2008, 26 pages.

* cited by examiner

NOISE-SHAPED POWER CONVERTERS

FIELD OF THE DISCLOSURE

This disclosure relates generally to power converters and, more particularly, to noise-shaped frequency hopping power converters.

BACKGROUND

Switch mode power converters (e.g., direct current (DC) to DC power converters) convert an input voltage to an output voltage utilizing switching circuitry that is controlled by a switching signal having a switching frequency. Switch mode power converters that utilize a constant switching frequency induce tonal noise at the input voltage and output voltage. The noise of a constant rate switching converter occurs at the fundamental switching frequency and its harmonics. This tonal noise may be magnified during amplification. Such noise is undesirable because it may interfere with electronic devices supplying the input voltage and/or operating using the output voltage.

BRIEF DESCRIPTION OF THE DRAWINGS

The figures are not to scale. Wherever appropriate, the same reference numbers will be used throughout the drawing(s) and accompanying written description to refer to the same or like parts.

SUMMARY

Examples disclosed herein implement and/or control a switching/frequency hopping power converter using noise-shaped frequency hopping to reduce low frequency noise due to the switching (e.g., by shifting spread spectrum tonal energy to higher frequencies away from DC). In some examples, an output of a pseudo-random generator is noise-shaped to control a frequency selection signal for driving a switching signal for the switching power converter.

An example apparatus to perform power conversion disclosed herein includes a shaped number generator having a first output to output a noise-shaped selection signal. The example apparatus also includes a switching power converter having a first input to receive an input voltage signal, a second input to receive a switching signal that is based on the noise-shaped selection signal, and a first output to output an output voltage signal based on the switching signal.

An example method for power conversion disclosed herein includes generating a number signal. The example method also includes noise-shaping the number signal to generate a noise-shaped selection signal. The example method further includes driving a switching power converter based on the noise-shaped selection signal.

An example computer readable medium comprises instructions that, when executed, cause a machine to generate a number signal, noise-shape the number signal to generate a noise-shaped selection signal, and control a switching power converter based on the noise-shaped selection signal

DETAILED DESCRIPTION

Frequency hopping power converters, also known as spread spectrum power converters, utilize a variable switching frequency to spread the tonal noise energy into a wider spectrum as compared with constant rate switching power converters. For example, the switching frequency may be randomly selected. While such frequency hopping may spread the tonal energy over a wider spectrum to reduce the total tonal energy from a constant switching frequency, the tonal energy may be increased at certain frequencies within the wider spectrum (e.g., may be increased at frequencies at which noise is more undesirable). For example, in sensitive electronic devices (e.g., high fidelity audio devices), it may be undesirable for the tonal energy to be increased at low frequency close to DC. This is particularly true when amplification multiplies low frequencies tonal energy, thereby increasing a noise floor of the power converter.

Example power converters disclosed herein utilize noise-shaping during selection of the switching frequency to shift tonal noise energy away from certain frequencies (e.g., away from frequencies at which noise is more undesirable). For example, in some examples disclosed herein, high frequency shaping is utilized to reduce the noise content at frequencies near DC. Accordingly, the benefits of spreading the tonal energy over a wide spectrum can be obtained while avoiding an increase in tonal energy at undesired frequencies (e.g., near DC).

Figure 1:
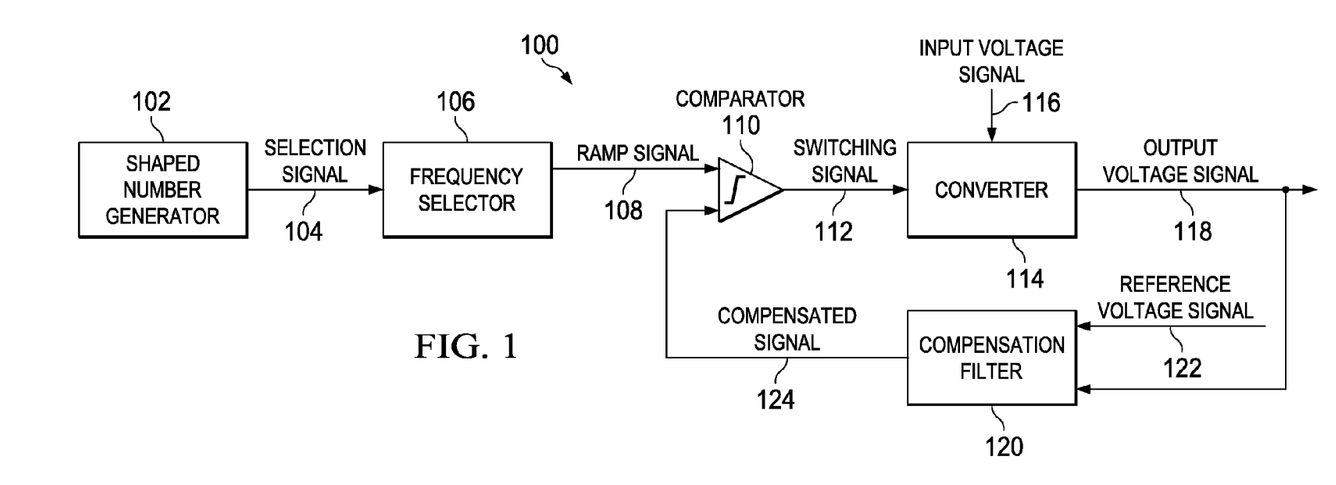
FIG. 1 is a block diagram of an example power converter employing noise-shaped frequency hopping in accordance with an embodiment

FIG. 1 is a block diagram of an example power converter 100 employing noise-shaped frequency hopping in accordance with an embodiment. The power converter 100 may be utilized in any application in which transformation of an input signal into an output signal is desired (e.g., a power transformer, an electronic device power supply, a vehicle voltage converter, etc.). The example power converter 100 of FIG. 1 includes an example shaped number generator 102 to convey a selection signal 104 to a frequency selector 106 to control the frequency selector 106 such that a ramp signal 108 output by the frequency selector 106 hops frequencies in a manner that shifts tonal noise energy of the example power converter 100 away from DC (e.g., away from low frequency such as less than 20 kHz, less than 10 kHz, less than 1 kHz). The example power converter 100 also includes an example comparator 110, an example converter 114, and an example compensation filter 120.

As used herein, low frequency is defined to be frequencies less-than one-half the operation frequency (e.g., clock rate) of the example power converter 100. Very low frequency is defined to be frequencies less-than or equal-to one-half of one-tenth (one-twentieth) of the operation frequency. High frequency is defined to be frequencies greater-than one-half of the operation frequency of the example power converter 100.

The example shaped number generator 102 generates values that are combined to form the example selection signal 104. For example, the shaped number generator 102 may generate digital number values that are output sequentially based on a clock signal to generate the selection signal 104. The example shaped number generator 102 generates the selection signal 104 to shift the tonal noise energy of the power converter 100. According to the illustrated example, the shaped number generator 102 shifts the tonal noise energy to higher frequencies and away from very low frequencies by selecting digital number values for the selection signal 104 that will cause the example frequency selector 106 to select relatively higher frequencies more often. Shifting the tonal noise to higher frequencies and away from very low frequency is desirable when, for example, the input and/or output of the example power converter 100 is connected to electronic devices that are sensitive to low frequency and/or DC noise. Alternatively, the shaped number generator 102 may shift the tonal noise frequency in any other manner (e.g., shift tonal noise to low frequencies, shift tonal noise to mid-spectrum frequencies, etc.

Figure 2:
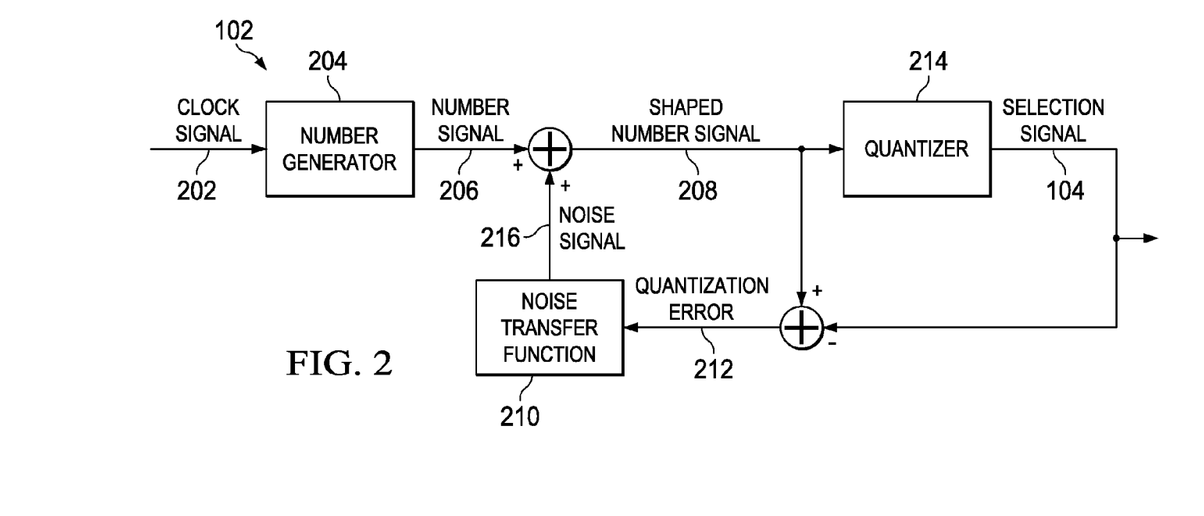
FIG. 2 is a block diagram of an example implementation of the shaped number generator of FIG. 1.

An example digital implementation of the shaped number generator 102 is described in conjunction with FIG. 2. Alternatively, the example shaped number generator 102 may be implemented in any other manner. For example, the shaped number generator 102 may be implemented by analog circuitry that outputs a noise-shaped analog signal (e.g., a voltage level) that is provided to a quantizer that converts the analog signal to a digital signal for the example frequency selector 106.

The example frequency selector 106 generates the ramp signal 108 that is conveyed to the example comparator 110. The frequency selector 106 of the illustrated example selects a frequency for the ramp signal 108 based on the selection signal 104. According to the illustrated example, the output of the example frequency selector 106 is a ramp signal. Alternatively, the output of the frequency selector 106 may be any other type of signal such as, for example, a sawtooth wave, a sine wave, etc. While the example frequency selector 106 is implemented using a digital processor, the frequency selector 106 may be implemented by any other element. For example, the frequency selector 106 may be implemented by analog circuitry that generates the ramp signal 108 at a frequency specified by the selection signal 104.

The example comparator 110 of FIG. 1 is a trigger that switches "on" to output an example switching signal 112 when the example ramp signal 108 meets and/or exceeds an example compensated signal 124 that is fed back from an output voltage signal 118 output by the example converter 114 that transforms an example input voltage signal 116. Conversely, the example comparator 110 switches "off" when the example ramp signal 108 meets and/or is less than the compensated signal 124. In other words, the example comparator 110 turns "on" in response to the example ramp signal 108 meeting or exceeding the example compensated signal 124. The example comparator 110 conveys a switching signal 112 to control the example converter 114. According to the illustrated example, when the example comparator 110 is "on" a positive voltage is output on the switching signal 112 to enable the example converter 114. While the example comparator 110 is a digital comparator (e.g., implemented by a digital signal processor), the example comparator 110 may be implemented by any other element including analog circuitry that outputs a switching signal 112 based on the ramp signal 108 and the compensated signal 124.

The example converter 114 is a DC to DC step down converter (also known as a buck converter, a class-D amplifier, etc.) that receives the example input voltage signal 116 and outputs the output voltage signal having a stepped down voltage and/or current as compared with the example input voltage signal 116. An example implementation of the example converter 114 is described in conjunction with FIG. 4. Alternatively, the converter 114 may be implemented by any other type of switching converter, regulator, amplifier, etc. (e.g., a boost converter, an inverting converter, a flyback converter, an audio amplifier, etc.) to step up and/or step down the input voltage signal 116.

The example compensation filter 120 receives the output voltage signal 118 and a reference voltage signal 122 and outputs the example compensated signal 124. The example reference voltage signal 122 has a voltage at the desired output voltage for the example output voltage signal 118. According to the illustrated example, the example compensation filter 120 is implemented by an operational amplifier and a resistor/capacitor (RC) network that amplifies an error between the output voltage signal 118 and the reference voltage signal 122 to output the compensated signal 124 to provide a feedback loop for operation of the example power converter 100. Alternatively, the compensation filter 120 may be implemented by any other components to provide the feedback loop.

In operation, the example shaped number generator 102 generates the example selection signal 104 to cause the example frequency selector 106 to output the example ramp signal 108 at a selected frequency. When the example ramp signal 108 exceeds the compensated signal 124 (e.g., the feedback loop of the output voltage signal 118 filtered by the example compensation filter 120), the comparator 110 causes the switching signal 112 to go high. When the switching signal 112 is high, the converter 114 allows the input voltage signal 116 to flow to the output voltage signal 118. Conversely, when the switching signal 112 is low, the converter 114 prevents the input voltage signal 116 from flowing to the output voltage signal 118. According to the illustrated example, the example shaped number generator 102 selects the selection signal 104 using digital noise shaping to push more of the tonal noise energy of the example power converter 100 to higher frequencies away from DC (e.g., away from very low frequency).

FIG. 2 is a block diagram of an example implementation of the shaped number generator 102 of FIG. 1. The example shaped number generator 102 of FIG. 2 includes an example number generator 204, an example noise transfer function 210, and an example quantizer 214.

The example number generator 204 receives a clock signal 202 and outputs a number signal 206. The number generator 204 of the illustrated example is a digital pseudorandom number generator. Alternatively, the number generator 204 may be any other type of component to generate a number signal 206 (e.g., an analog circuit to generate an analog signal at a voltage level indicative of a value for the number signal 206). While the example shaped number generator 102 includes the example number generator 204, some implementations of the example shaped number generator 102 may not include a number generator. For example, the number signal 206 could be a constant (DC) value output by a component of the example shaped number generator 102 and/or received from any other source. For example, the shaped number generator 102 may include a sigma-delta modulator (e.g., sigma-delta modulator 308 of FIG. 3) or other signal shaping (e.g., noise shaping) component that shapes quantization noise (e.g., to shift the quantization noise to high frequency away from low and/or very low frequency).

The example noise transfer function 210 receives a quantization error 212 and outputs a noise signal 216 that is combined with the example number signal 206 to generate an example shaped number signal 208. The example quantization error 212 is the difference between the example shaped number signal 208 and the selection signal 104 that is the output of the example shaped number generator 102 of FIG. 2 (e.g., the shaped number signal 208 minus the selection signal 104 output by the example quantizer 202). The example noise transfer function 210 provides high-pass filtering of the error of the example quantizer 214 to push the power to higher frequencies to shape the selection signal 104. According to the illustrated example, the noise transfer function 210 adds a delay for first order noise shaping. Alternatively, a second order or another type of filtering may be applied. While an example feedback loop is illustrated in FIG. 2, any other feedback arrangement may be utilized for shaping the selection signal 104.

The example quantizer 214 receives the example shaped number signal 208 and outputs the example selection signal 104 to control a frequency of the switching signal (e.g., the example switching signal 112) utilized in a power converter (e.g., the example power converter 100 of FIG. 1). The example quantizer 214 quantizes the example shaped number signal 208 into a desired number of output levels (e.g., 16 discrete output levels). While the example quantizer 214 receives a digital input and outputs a digital quantized output, any other type of quantizer may be utilized (e.g., an analog quantizer).

In operation, the example number generator 204 generates a new value for the example number signal 206 at each pulse of the example clock signal 202. The example number signal 206 is combined with an output of the example noise transfer function 210 to generate the shaped number signal 208. The shaped number signal 208 is noise shaped such that noise energy is shifted towards the fundamental frequency of the example power converter 100. The example quantizer 214 converts the shaped number signal 208 to a quantized signal (the selection signal 104) that is compatible with the example frequency selector 106 of FIG. 1.

Figure 3:
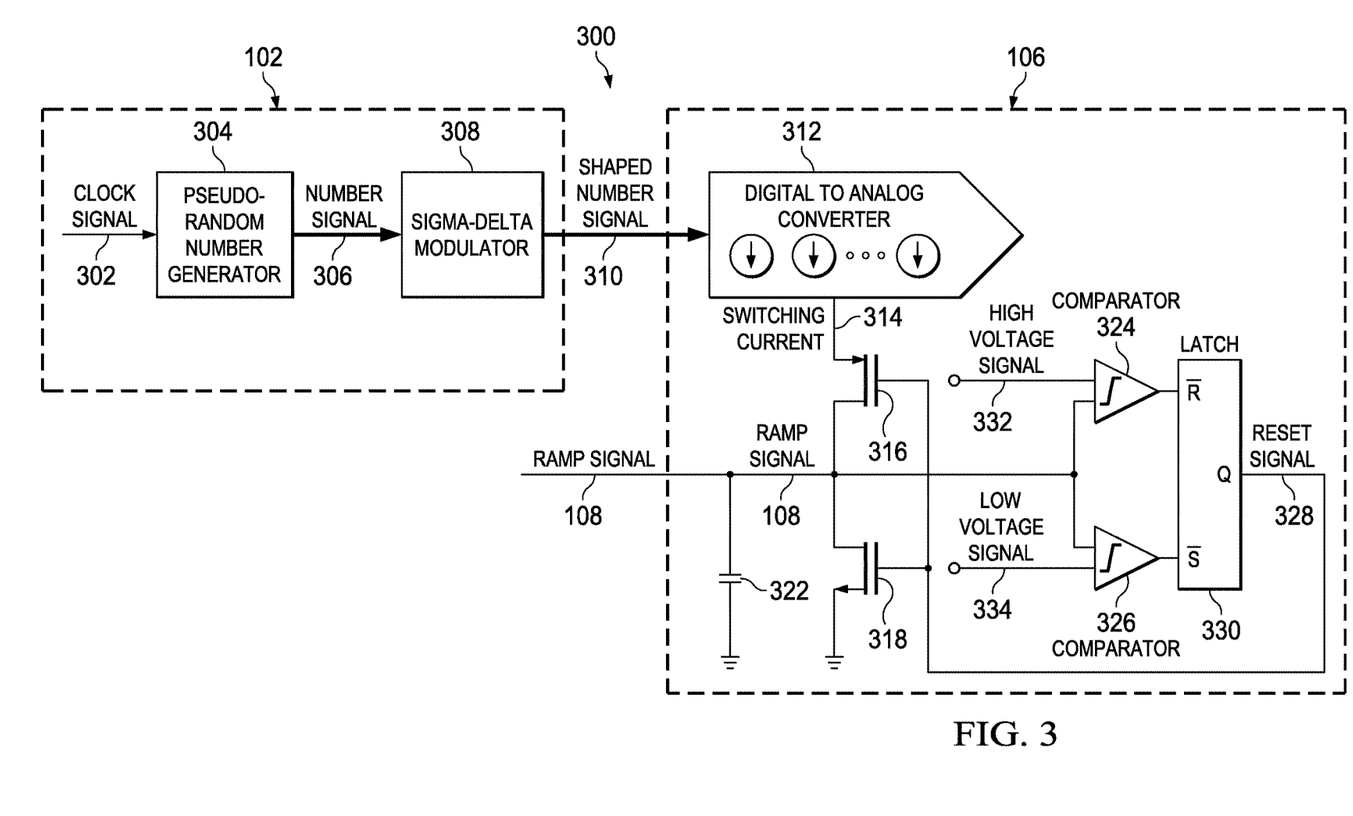
FIG. 3 is a block diagram of an example shaped frequency generator that may be used to implement the shaped number generator and the example frequency selector to generate the example ramp signal of FIG. 1.

FIG. 3 is a block diagram of an example shaped frequency generator 300 that may be used to implement the shaped number generator 102 and the example frequency selector 106 to generate the example ramp signal 108 of FIG. 1.

The example shaped frequency generator 300 includes an example pseudo-random number generator 304 that generates a new pseudo-random number for a number signal 306 at each pulse of a clock signal 302. The example number signal 306 is conveyed to a sigma-delta modulator 308.

The example sigma-delta modulator 308 quantizes the example number signal 306 and noise shapes the quantization noise to output the example shaped number signal 310. According to the illustrated example, the sigma-delta modulator 308 provides high-pass noise filtering to push the noise energy away from very low frequency. The shaped number signal 310 is conveyed to an example digital to analog converter 312. In the illustrated example, the example sigma-delta modulator 308 shifts its own noise to higher frequency. For example, noisy input from the pseudo-random number generator 304 may not be shifted by the example sigma-delta modulator 308. In such examples, very low frequency noise from the pseudo-random number generator 304 or another source may dominate the shaped noise from the example sigma-delta modulator 308. In some such examples, to avoid adding noise from the example pseudo-random number generator 304, the pseudo-random number generator 304 may be eliminated from the shaped frequency generator 300 (e.g., using an implementation of the sigma-delta modulator 308 that accepts a DC input). In some such examples, noise may be added to an input to a quantizer within the sigma-delta modulator 308 (e.g., may be added to the shaped number signal 208 of FIG. 2) to dither (e.g., randomize the quantization noise) the sigma-delta modulator 308.

The example digital to analog converter 312 converts the example shaped number signal 310 to an analog switching current 314. The example switching current 314 is conveyed to a source terminal of a metal-oxide-semiconductor field-effect transistor (MOSFET) 316. The drain of the example transistor 316 is connected to another MOSFET 318, which has a source terminal connected to ground. The drains of the transistors 316, 318 are also connected to the example ramp signal 108 (e.g., the example ramp signal 108 that may be conveyed to the example comparator 110 of FIG. 1) that is connected to ground via a capacitor 322. Additionally, the drains of the example transistors 316, 318 are connected to an input of each of a first comparator 324 and a second comparator 326. Gate terminals of the example transistors 316, 318 are connected to an example reset signal 328 output by an example latch 330.

The example first comparator 324 and the example second comparator 326 control the example latch 328. To implement hysteresis for the example latch 330, the example first comparator 324 is a trigger that is turned "on" when an example high voltage signal 332 (e.g., a reference for a desired high voltage threshold) exceeds the example ramp signal 108 and is turned "off" when an example high voltage signal 332 is less-than or equal-to the example ramp signal 108. The example second comparator 326 is a trigger that is turned "on" when the example ramp signal 108 exceeds an example low voltage signal 334 (e.g., a reference for a desired low voltage threshold) and is turned "off" when the example ramp signal 108 is less-than or equal-to the example low voltage signal 334. In other words, when the example ramp signal 108 is below the high voltage signal 332 and the low voltage signal 334, the example first comparator 324 is "on" and the example second comparator 326 is "off." When the example ramp signal 108 is between the low voltage signal 334 and the high voltage signal 332, the first comparator 324 is "on" and the second comparator 326 is "on." When the example ramp signal 108 is greater than both the low voltage signal 334 and the high voltage signal 332, the first comparator 324 is "off" and the second comparator 326 is "on." According to the illustrated example, the addition of hysteresis eliminates metastability within the example latch 330 (e.g., prevents the example latch 330 from persisting in metastable state without settling into a stable logic state).

The example latch 330 of the FIG. 3 is an inverted set/reset latch. According to the illustrated example, when a low signal is applied to the S input of the example latch 330, the latch 330 is turned "on" and outputs a digital high signal that allows current to flow through the example transistors 316, 318. Accordingly, when the example ramp signal 108 is less than the example low voltage signal 334, the output of the example second comparator 326 is low and the example latch 330 is set and outputs a high signal to turn on the example transistors 316, 318. The flow of current through the transistors 316, 318 will allow the ramp signal 108 to increase with the output of the example digital to analog converter 312 as the example capacitor 322 is charged. As the example ramp signal 108 increases to exceed the low voltage signal 334, the example second comparator 326 is turned "on" but the example latch 330 is already set. Furthermore, the first comparator 324 is "on" so the reset of the example latch 330 is not triggered. As the ramp signal 108 increases to exceed the high voltage signal 332, the first comparator 324 turns "off" triggering the example latch 330 to reset, which turns the example transistors 316, 318 "off" and allows the example capacitor 322 to discharge.

While an example manner of implementing the example shaped number generator 102 and/or the example frequency selector 106 of FIG. 1 is illustrated in FIGS. 2-3, one or more of the elements, processes and/or devices illustrated in FIGS. 2-3 may be combined, divided, re-arranged, omitted, eliminated and/or implemented in any other way. Further, the example number generator 204, the example noise transfer function 210, the example quantizer 214, and/or, more generally, the example shaped number generator 102 of FIG. 2, and/or the example pseudo-random number generator 304, the example sigma-delta modulator 308, the example digital to analog converter 312, the example transistors 316, 318, the example first comparator 324, the example second comparator 326, the example latch 330, and/or more generally, the example shaped frequency generator 300 of FIG. 3 may be implemented by hardware, software, firmware and/or any combination of hardware, software and/or firmware. Thus, for example, any of the example number generator 204, the example noise transfer function 210, the example quantizer 214, and/or, more generally, the example shaped number generator 102 of FIG. 2, and/or the example pseudo-random number generator 304, the example sigma-delta modulator 308, the example digital to analog converter 312, the example transistors 316, 318, the example first comparator 324, the example second comparator 326, the example latch 330, and/or more generally, the example shaped frequency generator 300 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). Further still, the example shaped number generator 102 and/or the example frequency selector 106 of FIG. 1 may include one or more elements, processes and/or devices in addition to, or instead of, those illustrated in FIGS. 2-3, and/or may include more than one of any or all of the illustrated elements, processes and devices.

Figure 4:
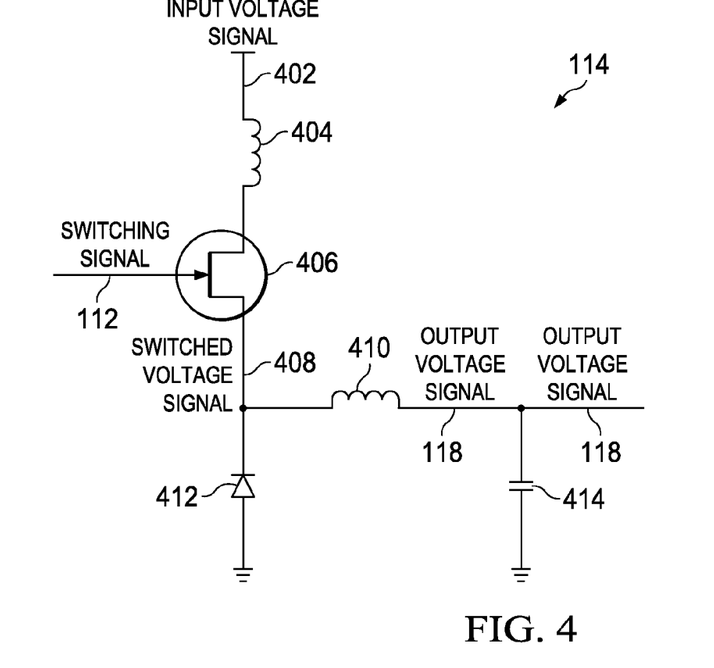
FIG. 4 is a circuit diagram of an implementation of the example converter of FIG. 1.

FIG. 4 is a circuit diagram of an implementation of the example converter 114 of FIG. 1. The example converter 114 converts an input voltage signal 402 to the output voltage signal 118. The example converter 114 of FIG. 1 is a step down converter that steps a high input voltage (e.g., 12 Volts) down to a low output voltage (e.g., 1.3 Volts). Alternatively, the converter 114 may be implemented by any other type of converter to provide step down and/or step up conversion of an input signal.

The example converter 114 of FIG. 4 includes an example input inductor 404 that couples the input voltage signal 402 to a source terminal of an example power transistor 406. The example power transistor 406 includes a gate terminal coupled to the example switching signal 112. The example power transistor 406 further includes an example drain terminal connecting an example switched voltage signal 408 to an example output inductor 410 and to ground via an example regulator diode 412. The example output inductor couples the drain terminal of the example power transistor 406 to the output voltage signal 118 that is the voltage drop across an example output capacitor 414.

In operation, when the example switching signal 112 is high, the example power transistor 406 is switched "on" allowing current to flow through the example input inductor 404 and through the example output inductor 410 to the output voltage signal 118. The current flow will cause the example input inductor 404 and the example output inductor 410 to produce an opposing voltage in response to the changing current. The opposing voltage reduces the voltage at the example output voltage signal 118, thereby, providing the stepped down voltage of the example converter 114 of FIG. 4. As long as the switching signal 112 opens the power transistor 406 before the example input inductor 404 and the example output inductor 410 are charging, the example output voltage signal 118 will always have a voltage that is less than the example input voltage signal 402. When the power transistor 406 is opened, the example output inductor 410 will begin discharging to source provide current flow to a load through the example voltage signal 118.

While an example manner of implementing the example shaped converter 114 of FIG. 1 is illustrated in FIG. 4, one or more of the elements, processes and/or devices illustrated in FIG. 4 may be combined, divided, re-arranged, omitted, eliminated and/or implemented in any other way. Further, the example converter 114 of FIGS. 1 and/or 4 may be implemented by hardware, software, firmware and/or any combination of hardware, software and/or firmware. Thus, for example, the example converter 114 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). Further still, the example converter 114 of FIGS. 1 and/or 4 may include one or more elements, processes and/or devices in addition to, or instead of, those illustrated in FIG. 4, and/or may include more than one of any or all of the illustrated elements, processes and devices.

Figure 5:
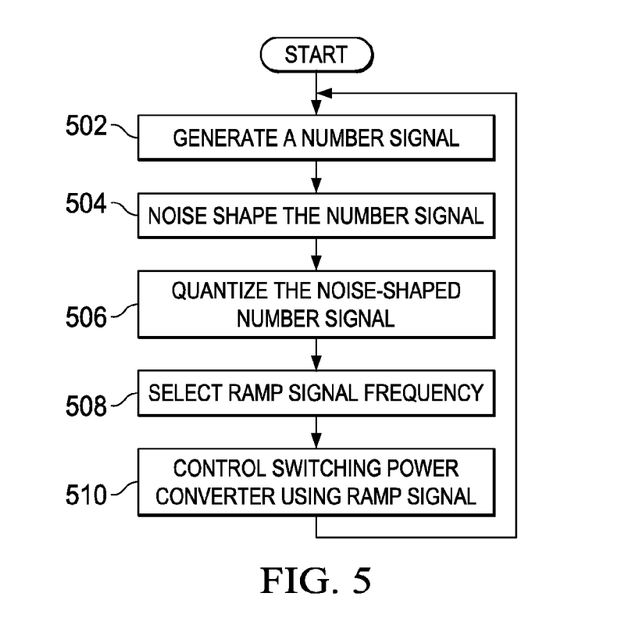
FIG. 5 is a flowchart representative of example machine readable instructions for implementing the example power converter of FIG. 1.

A flowchart representative of example machine readable instructions for implementing the example power converter 100 of FIG. 1 is shown in FIG. 5. In this example, the machine readable instructions comprise a program for execution by a processor such as the processor 612 shown in the example processor platform 600 discussed below in connection with FIG. 6. The program may be embodied in software stored on a tangible computer readable storage medium such as a memory, CD-ROM, a floppy disk, a hard drive, a digital versatile disk (DVD), or a Blu-ray disk associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example power converter 100 may alternatively be used. For example, the order of execution of the blocks may be changed, and/or some of the blocks described may be changed, eliminated, or combined.

As mentioned above, the example processes of FIG. 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The process of FIG. 5 begins when a clock signal (e.g., the example clock signal 202 of FIG. 2 or the example clock signal 302 of FIG. 3) triggers the example number generator 204 (or the example pseudo-random number generator 304 of FIG. 3) to generate the example number signal 206 (or the example number signal 306 of FIG. 3) (block 502).

The example number signal 206 is then noise-shaped by the example noise transfer function 210 (or the example sigma-delta modulator 308 of FIG. 3) to shift noise energy away from very low frequency (block 504). While the example block diagrams of FIGS. 2 and 3 include example components for shifting the noise energy to higher frequencies, any technique to shape the selection signal 104 and/or the switching current 314 to cause the noise energy of the example power converter 100 to be shifted may be utilized.

The example quantizer 214 (or the example digital to analog converter 312 of FIG. 3) then quantizes the example shaped number signal 208 (or the example shaped number signal 310) (block 506). For example, any technique to convert the shaped number signal 208 to a discrete level for selecting/controlling a frequency of the example ramp signal 108 may be utilized.

The example frequency selector 106 (or the example digital to analog converter 312 of FIG. 3) then selects a frequency for the example ramp signal 108 based on the quantized value from the shaped number signal 208 (or the example shaped number signal 310) (block 508). For example, according to the example of FIG. 1, the example frequency selector 106 selects one of set of discrete frequencies for the example ramp signal 108 based on the example selection signal 104. Alternatively, according to FIG. 3, the example digital to analog converter 312 outputs a steering current as the example switching current 314 at a frequency controlled by the example selection signal 310.

The example power convertor 100 then controls a switching power converter using the example ramp signal 108 (block 510). For example, as shown in FIG. 1, the example ramp signal 108 is conveyed to the example comparator 110 to control the example converter 114 (e.g., by cycling the example power transistor 406 of FIG. 4). Because the ramp signal 108 has been generated using variable frequencies, the tonal noise energy is distributed across the frequency spectrum like a conventional frequency hopping converter. However, the disclosed noise-shaping techniques also shift the noise energy away from very low and/or low frequencies to, for example, avoid interference with electronic devices that are sensitive to DC noise.

After block 510, the process of FIG. 5 repeats (control returns to block 502) at the next pulse from the example clock signal 202 (or the example clock signal 302 of FIG. 3).

Figure 6:
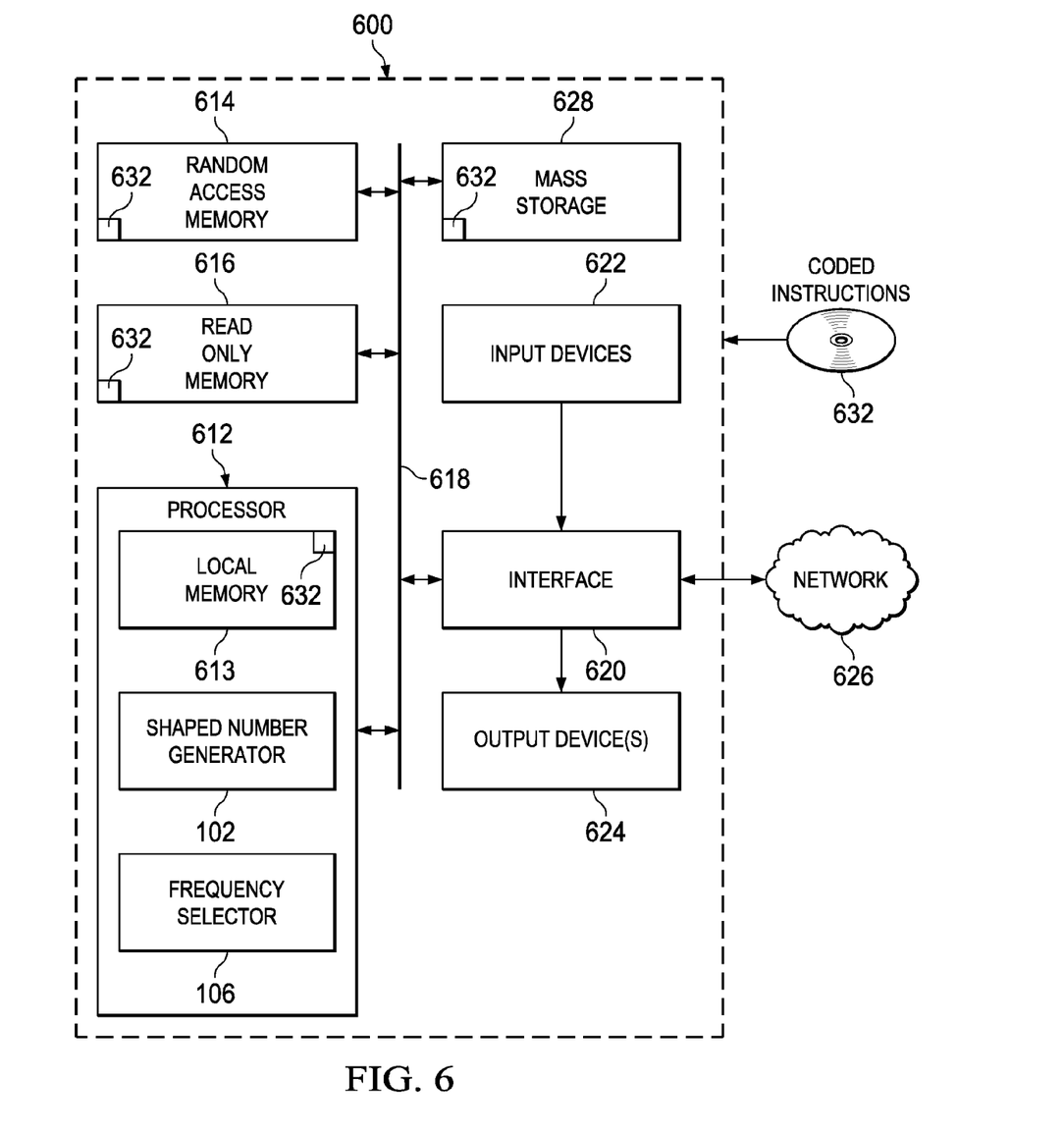
FIG. 6 is a block diagram of an example processor platform structured to execute the instructions of FIG. 5 to implement the example power converter of FIGS. 1-4.

FIG. 6 is a block diagram of an example processor platform 600 capable of executing the instructions of FIG. 5 to implement the shaped number generator 102 and/or the frequency selector 106 of FIGS. 1-3. The processor platform 600 can be, for example, a processor system on an integrated circuit, a process-based power supply, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The example local memory 613 stores instructions for implementing the example shaped number generator 102 and/or the example frequency selector 106 of FIG. 1. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, a keyboard, a button, and/or any other input device.

One or more output devices 624 are also connected to the interface circuit 620 of the illustrated example. The output devices 624 can be implemented, for example, by a power input of an electronic device, a display device (e.g., a light emitting diode (LED), an organic light emitting diode (OLED), a liquid crystal display, a cathode ray tube display (CRT), or any other output device. The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIG. 6 may be stored in the mass storage device 628, in the volatile memory 614, in the non-volatile memory 616, and/or on a removable tangible computer readable storage medium such as a CD or DVD.

From the foregoing, it will appreciated that the above disclosed noise-shaped frequency power converters improve upon constant rate switching power converters by spreading the switching noise across a wide spectrum and improve upon frequency hopping switching power converters by shifting the switching noise away from (or towards) a desired frequency (e.g., shifting the spread spectrum noise away from very low frequency). For example, some disclosed noise-shaped frequency power converters reduce noise at low and/or very low frequencies that may interfere with electronic devices that are sensitive to noise near DC. In some examples, the disclosed noise-shaped frequency power converters shift the noise away from undesired frequency regions, thereby, reducing the reliance on filtering components (e.g., analog filtering components) that may be used to filter the noise from undesired frequency regions (e.g., avoids the need for large and expensive on-board capacitors that may otherwise be needed to filter the low frequency content). In some examples, the disclosed noise-shaped frequency power converters shift the frequency away from undesired frequency regions which are difficult to filter and which, when amplified by an amplifier, increase an overall noise floor of a power supply or other component employing the example noise-shaped frequency power converters.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to perform power conversion, the apparatus comprising:
    a shaped number generator that generates a noise-shaped selection signal and having an output to output the noise-shaped selection signal, wherein the shaped number generator includes a pseudo-random number generator that generates a number signal, a first adder that combines the number signal with a noise signal to generate a shaped number signal, and a quantizer that quantizes the shaped number signal to generate the noise-shaped selection signal, and wherein the noise signal is generated by filtering a quantization error between the shaped number signal and the noise-shaped selection signal;
    a frequency selector having an input to receive the noise-shaped selection signal and an output to output a ramp signal that is generated based on the noise-shaped selection signal; and
    a switching power converter having a first input to receive an input voltage signal, a second input to receive a switching signal to control a power transistor of the switching power converter, and an output to output an output voltage signal transformed from the input voltage signal based on the switching signal controlling the power transistor;
    wherein the switching signal is based on the ramp signal, and wherein the noise-shaped selection signal generated by the shaped number generator is not dependent on the ramp signal.

2. The apparatus as defined in claim 1, further including a comparator having a first input to receive the ramp signal, a second input to receive a feedback signal, and an output to output the switching signal based on a comparison of the ramp signal and the feedback signal.

3. The apparatus as defined in claim 2, wherein the feedback signal is output by a compensation filter having a first input to receive the output voltage signal of the switching power converter, a second input to receive a reference signal, and an output to output a compensated signal as the feedback signal.

4. The apparatus as defined in claim 1, wherein the switching power converter is a buck converter.

5. The apparatus as defined in claim 1, wherein the shaped number generator includes a sigma-delta modulator to distribute quantization noise away from very low frequency.

6. The apparatus as defined in claim 1, wherein the noise-shaped selection signal is generated by adding a high-pass filtered quantization noise signal to a pseudo-random number signal.

7. The apparatus as defined in claim 1, wherein the pseudo-random number generator generates receives a clock signal and generates a new pseudo-random number for each pulse of the clock signal.

8. The apparatus as defined in claim 1, comprising a feedback path between an output of the quantizer and a first input of the first adder, wherein the feedback path includes a second adder that determines the quantization error as a difference between the noise-shaped selection signal and the shaped number signal, and a filter that filters the quantization error to generate the noise signal, wherein the first input of the first adder receives the noise signal and a second input of the first adder receives the number signal.

9. The apparatus as defined in claim 1, wherein the frequency selector comprises:
    a digital-to-analog converter that receives the noise-shaped selection signal and produces an analog switching current based on the noise-shaped selection signal;
    a first MOSFET transistor having a source terminal that receives the analog switching current and a drain terminal connected to an output of the frequency selector that outputs the ramp signal;
    a second MOSFET transistor having a source terminal coupled to ground and a drain terminal connected to the drain terminal of the first MOSFET transistor;
    a first comparator having a first input receiving a high voltage signal and a second input connected to the drain terminals of each of the first and second MOSFET transistors;
    a second comparator having a first input receiving a low voltage signal and a second input connected to the drain terminals of each of the first and second MOSFET transistors; and
    a latch circuit having a first input that receives an output of the first comparator, a second input that receives an output of the second comparator, and an output connected to a gate terminal of the first MOSFET transistor and a gate terminal of the second MOSFET transistor.

10. The apparatus as defined in claim 9, wherein the first input of the latch circuit is a reset input and the second input of the latch circuit is a set input.

11. The apparatus as defined in claim 9, wherein:
when the ramp signal has a value that is less than the high voltage signal and less than the low voltage signal, the first comparator is turned on and the second comparator is turned off;
when the ramp signal has a value that is greater than the low voltage signal and less than the high voltage signal, the first comparator is turned on and the second comparator is turned on; and
when the ramp signal has a value that is greater the high voltage signal and greater than the low voltage signal, the first comparator is turned off and the second comparator is turned on.

12. A method for power conversion, the method comprising:
generating a number signal;
noise-shaping the number signal to generate a noise-shaped selection signal, wherein noise-shaping the number signal to generate the noise-shaped selection signal includes adding a noise signal to the number signal to generate a shaped number signal and quantizing the shaped number signal to generate the noise-shaped selection signal;
generating a ramp signal by selecting, based on the noise-shaped selection signal, a frequency for the ramp signal, wherein the generation of the noise-shaped selection signal is not dependent on the ramp signal; and
controlling a switching power converter based on the ramp signal.

13. The method as defined in claim 12, wherein controlling the switching power converter based on the ramp signal includes comparing the ramp signal to a feedback signal to output a switching signal.

14. The method as defined in claim 13, wherein controlling the switching power converter based on the noise-shaped selection signal includes enabling a power transistor of the switching power converter when the switching signal indicates that the ramp signal meets or exceeds the feedback signal.

15. The method as defined in claim 12, wherein controlling the switching power converter based on the ramp signal reduces switching noise of the switching power converter at very low frequency and increases switching noise at high frequency.

16. The method as defined in claim 12, wherein the noise signal is a pseudo-random high-pass filtered quantization noise.

17. The method as defined in claim 12, wherein the number signal is a pseudo-random number generated using a pseudo-random number generator.

18. The method as defined in claim 12, wherein the number signal is a constant direct current (DC) value.

19. A tangible non-transitory computer readable medium comprising instructions that, when executed, cause a machine to at least:
generate a number signal;
noise-shape the number signal to generate a noise-shaped selection signal by adding a noise signal to the number signal to generate a shaped number signal and quantizing the shaped number signal to generate the noise-shaped selection signal; and
generate a ramp signal by selecting, based on the noise-shaped selection signal, a frequency for the ramp signal, wherein the generation of the noise-shaped selection signal is not dependent on the ramp signal; and
control a switching power converter to selectively enable or disable a power transistor of the switching power converter based on the ramp signal.

20. The tangible non-transitory computer readable medium as defined in claim 19, wherein the machine generates the number signal as a pseudo-random number using a pseudo-random number generator.

* * * * *